(12) United States Patent
Schettle et al.

(10) Patent No.: US 12,116,168 B2
(45) Date of Patent: Oct. 15, 2024

(54) ECO-FRIENDLY HANG TABS

(71) Applicant: Logitech Europe S.A., Lausanne (CH)

(72) Inventors: Adam Christopher Schettle, North Las Vegas, NV (US); Wang Yong, Shenzhen (CN)

(73) Assignee: LOGITECH EUROPE S.A., Lausanne (CH)

( * ) Notice: Subject to any disclaimer, the term of this patent is extended or adjusted under 35 U.S.C. 154(b) by 379 days.

(21) Appl. No.: 17/429,315

(22) PCT Filed: Jan. 19, 2020

(86) PCT No.: PCT/CN2020/072992
§ 371 (c)(1),
(2) Date: Aug. 6, 2021

(87) PCT Pub. No.: WO2021/142832
PCT Pub. Date: Jul. 22, 2021

(65) Prior Publication Data
US 2022/0106077 A1    Apr. 7, 2022

(51) Int. Cl.
| | |
|---|---|
| *B65D 25/22* | (2006.01) |
| *B65D 5/42* | (2006.01) |
| *B65D 5/46* | (2006.01) |
| *B65D 33/14* | (2006.01) |
| *B65D 35/24* | (2006.01) |

(52) U.S. Cl.
CPC ............ *B65D 25/22* (2013.01); *B65D 5/4208* (2013.01); *B65D 5/46* (2013.01); *B65D 33/14* (2013.01); *B65D 35/245* (2013.01); *B65D 2575/565* (2013.01)

(58) Field of Classification Search
CPC .... B65D 25/22; B65D 2575/565; B65D 5/46; B65D 5/4208; B65D 25/25; B65D 33/14; B65D 35/245; B65D 23/003; B65D 73/0064
See application file for complete search history.

(56) References Cited

U.S. PATENT DOCUMENTS

| | | | | |
|---|---|---|---|---|
| 3,695,418 A | * | 10/1972 | Gwozdz | ................. B65D 25/22 206/770 |
| 4,832,301 A | | 5/1989 | Hiramoto et al. | |
| 6,161,693 A | | 12/2000 | Findle et al. | |

(Continued)

FOREIGN PATENT DOCUMENTS

| | | |
|---|---|---|
| AU | 2018101202 A4 | 9/2018 |
| CN | 2646066 Y | 10/2004 |

(Continued)

OTHER PUBLICATIONS

EPO Supplementary European Search Report dated Aug. 5, 2022, for European Application No. 20914040.9.

(Continued)

*Primary Examiner* — Tan Le
(74) *Attorney, Agent, or Firm* — Patterson & Sheridan LLP

(57) ABSTRACT

A device used to display a consumer product, which are referred to herein as a hang tab (102). More specifically, to eco-friendly hang tabs (102) made of biodegradable, degradable, and/or recyclable materials that can be used to display consumer products.

20 Claims, 12 Drawing Sheets

(56) References Cited

U.S. PATENT DOCUMENTS

| | | | | |
|---|---|---|---|---|
| 6,349,974 | B1 * | 2/2002 | Grosskopf ........... | B65D 23/005 |
| | | | | 156/277 |
| 8,042,690 | B2 * | 10/2011 | Lewis .................. | B65D 43/162 |
| | | | | 206/467 |
| 2013/0240134 | A1 * | 9/2013 | Flynn ................... | G09F 3/10 |
| | | | | 156/60 |

FOREIGN PATENT DOCUMENTS

| | | | | |
|---|---|---|---|---|
| CN | 201095440 Y | | 8/2008 | |
| DE | 20208882 U1 | | 11/2002 | |
| EP | 2103535 A1 | * | 9/2009 | ............ B65D 25/22 |
| JP | 2001122329 A | * | 5/2001 | |
| JP | 2004359322 A | | 12/2004 | |
| JP | 3921316 B2 | | 5/2007 | |
| TW | 201545955 A | | 12/2015 | |
| WO | WO-2006122176 A1 | * | 11/2006 | ........... B65D 5/4208 |

OTHER PUBLICATIONS

EPO Communication Pursuant to Rules 70(2) and 70a(2) EPC for European Application No. 20914040.9.
Chinese OA dtd Jul. 5, 22 for Application No. 202080027628.4.
Notification of Transmittal of the International Search Report and the Written Opinion of the international Searching Authority for PCT/CN2020/072992 mailed Oct. 21, 2020.

* cited by examiner

ECO-FRIENDLY HANG TABS

BACKGROUND

Field

The present disclosure generally relates to a device used to display a consumer product, and more specifically, to eco-friendly devices made of biodegradable, degradable, or recyclable materials for displaying consumer products.

Description of the Related Art

In commercial retail stores, packages are often displayed for sale while mounted on rods or display supporting elements by the use of a hang tab. A conventional hang tab, which is typically made of polyester or plastic, has a hang portion that includes an aperture or a slot and a support portion that can be attached to a package that is to be displayed. The aperture or the slot of the hang tab is configured to receive and hang from a display supporting element that is attached to a display. The support portion attaches to a package to be suspended from the display supporting element. Particularly when the package or the object is in a rectangular shape, it is desirable for the hang portion to be folded to reduce space needed for shipment or storage.

Moreover, many companies and manufacturers have been trying to reduce the amount of materials used in the packaging of consumer products that are harmful to the environment. However, eco-friendly materials made of biodegradable, degradable, or recyclable materials have been avoided for use in configurations where these eco-friendly materials will receive a load during use. Eco-friendly materials have especially been avoided in cases where a load (e.g., force) will be continually applied to the material for an extended period of time, such as a case where the material is used to support the weight of a hanging consumer product while it is displayed for an extended period of time, such as days, weeks, or months. Typically, the eco-friendly materials, such as plant based pulp containing materials have been found to easily tear and/or break, hard to fold and unfold, and have poor water absorption resistance.

Therefore, there is a need for improved materials and structures used to display a consumer product that are eco-friendly and due to the selection of materials and/or structural design are durable, foldable, and/or water resistant.

SUMMARY

Embodiments of the disclosure include a hang tab for supporting a package. The hang tab includes a hang portion, a support portion, and a hinge portion that extends in a first direction and is disposed between the hang portion and the support portion. The hang tab may be formed from a fibrous material, and the hang portion includes an opening (e.g., slot) formed therein, and a central region that at least partially surrounds the opening. The central region may include two or more first regions, and a second region that is disposed between each adjacent pair of two or more first regions, wherein at least one physical attribute of each first region is different than a physical attribute of each second region. In some cases, the at least one different physical attribute is selected from a group consisting of a thickness and a mass density.

Embodiments of the disclosure may further include a package that includes one or more walls that are configured to at least partially enclose a consumer product, and a hang tab. The hang tab includes a hang portion, a support portion, and a hinge portion that extends in a first direction and is disposed between the hang portion and the support portion. The hang tab may be formed from a fibrous material, and the hang portion includes an opening formed therein, and a central region that at least partially surrounds the opening. The central region may include two or more first regions, and a second region that is disposed between each adjacent pair of two or more first regions, wherein at least one physical attribute of each first region is different than a physical attribute of each second region. In some cases, the at least one different physical attribute is selected from a group consisting of a thickness and a mass density.

Embodiments of the disclosure may further provide a method forming a package by attaching a hang tab to a first surface of a package that is configured to at least partially enclose a consumer product, wherein the package comprises one or more walls that are configured to enclose the consumer product, and the first surface is formed on one of the one or more walls, and the hang tab.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1A:
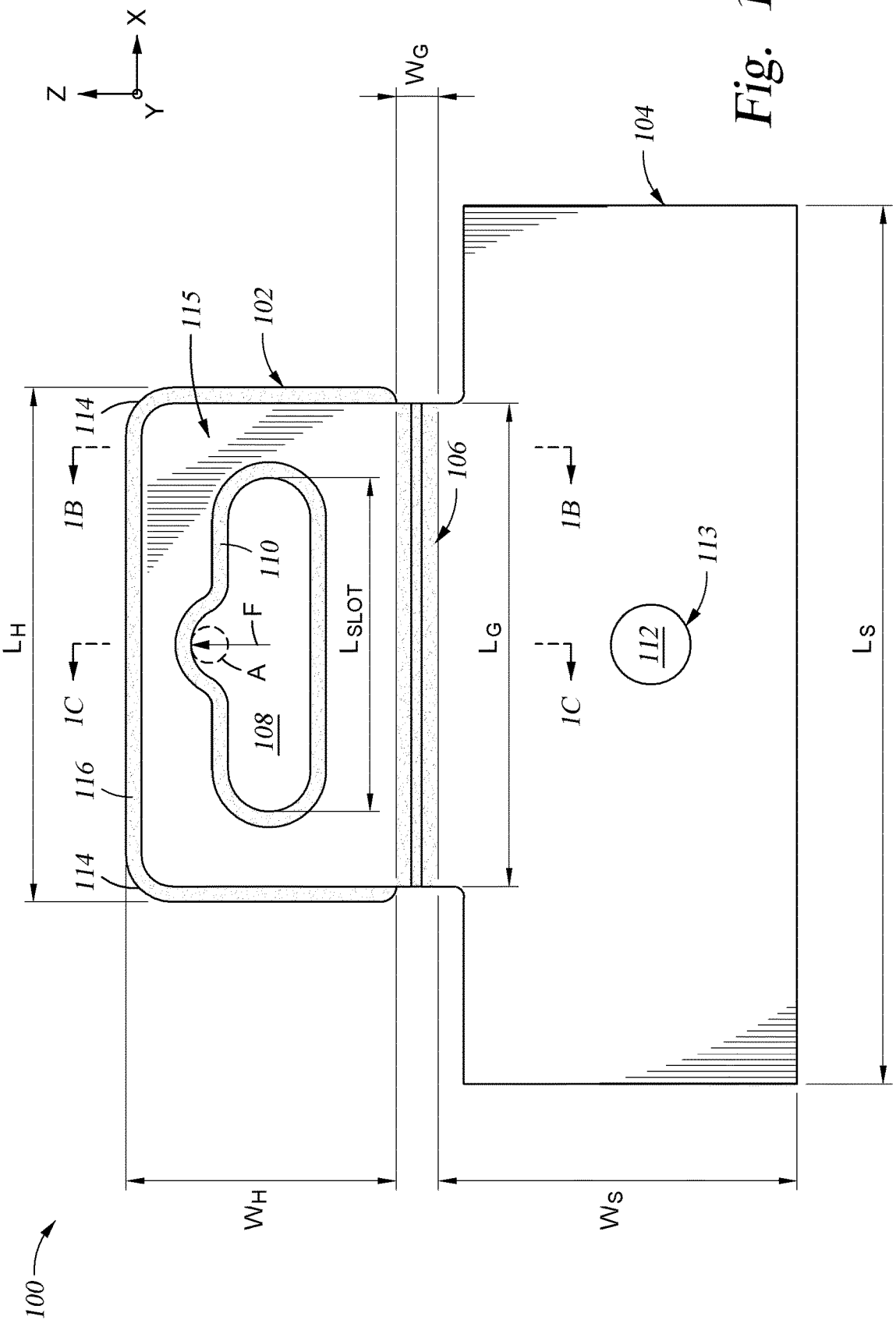
FIG. 1A is a front view of a hang tab, according to one or more embodiments.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a device used to display a consumer product, which is referred to herein as a hang tab. More specifically, to eco-friendly hang tabs made of biodegradable, degradable, and/or recyclable materials that can be used to display consumer products. In some embodiments, the displayed consumer product is disposed within a package that is used to support and retain the consumer product therein during shipment, storage and while it is on display. According to one embodiment, a package may include one or more walls that are configured to enclose the consumer product, and have a hang tab attached thereto. The hang tab, which is configured to support at least a portion of the weight the package, may include a hang portion that has an opening, also referred to herein as a slot, formed therein to receive a display supporting element, a support portion having a surface that can be attached to the package, and a hinge portion that is disposed between the hang portion and the support portion.

Hang tabs described herein are generally made of biodegradable, degradable, and/or recyclable materials, such as materials made from materials that include plant based materials, such as wood pulp. It is desirable for the hang tabs described herein to be foldable/un-foldable, durable against the stresses applied to portions of the hang tab during folding/un-folding and durable against becoming damaged and/or physically failing due to loads applied during normal use. In some cases, it is also desirable for the material(s) from which the hang tab is made to be useable after being shipped, stored and/or displayed in a humid and/or uncontrolled ambient environment. In some cases, the material(s) from which the hang tab is made are coated or treated with materials such that they do not significantly absorb water, which is referred to herein as being water resistant.

Figure 1B:
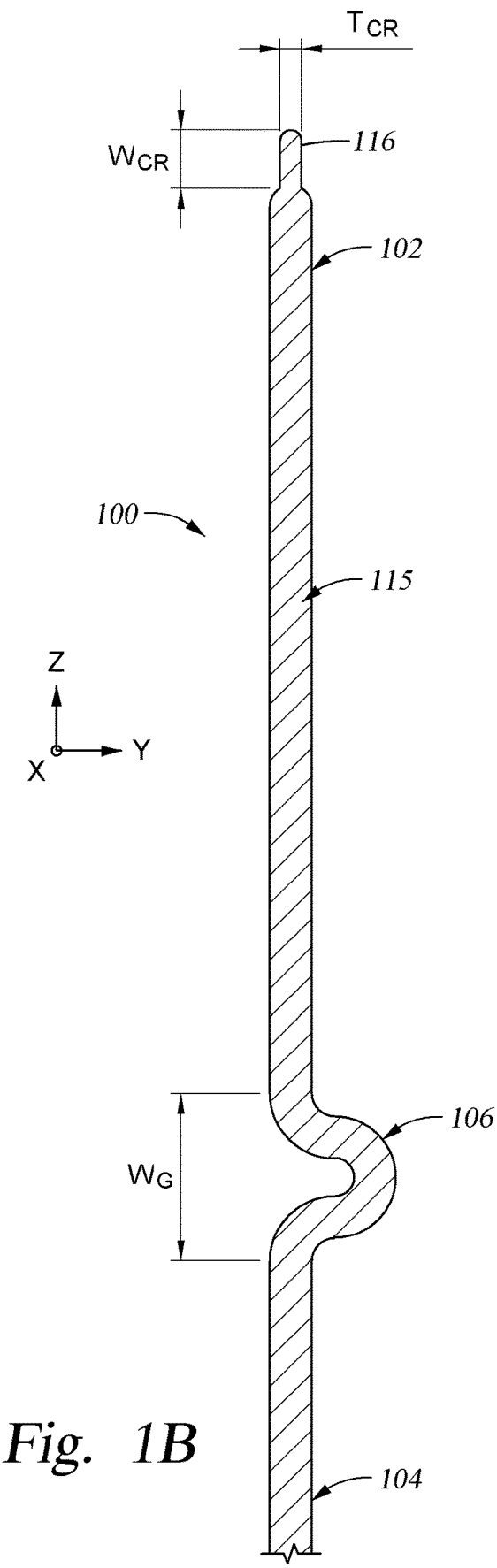
FIGS. 1B and 1C are side views of a hang tab, according to one or more embodiments.
Figure 1C:
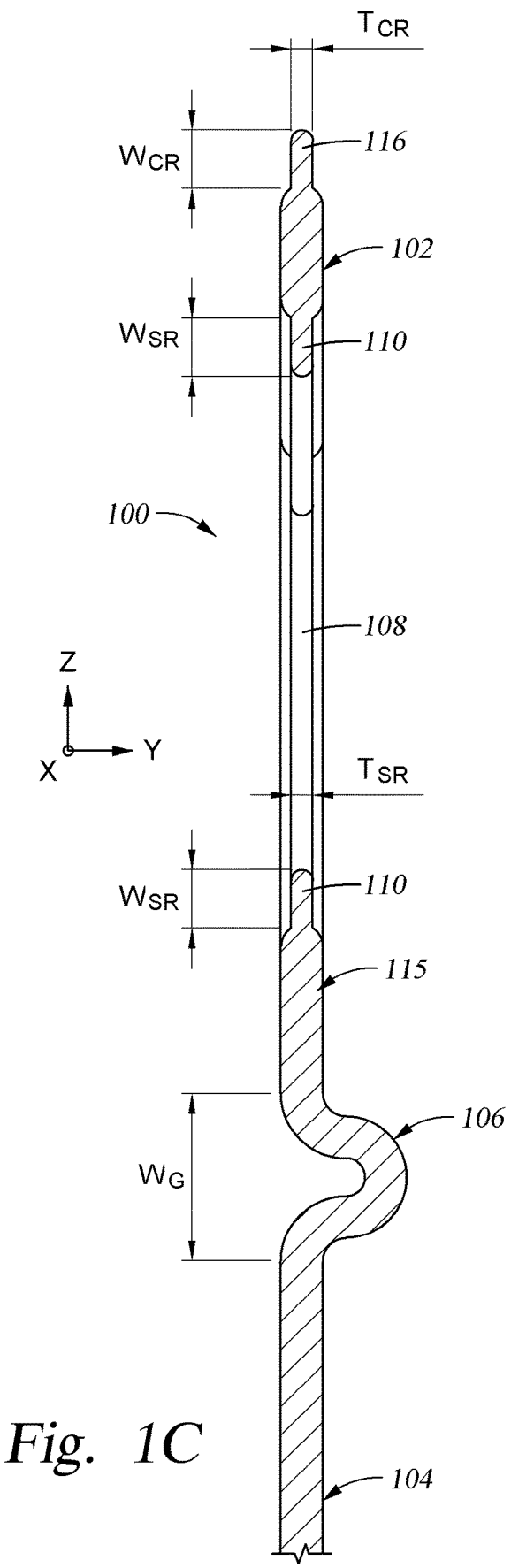

FIG. 1A is a front view of a hang tab 100 according to one or more embodiments. FIGS. 1B and 1C are side views of the hang tab 100 formed along the sectioning lines "1B-1B" and "1C-1C," respectively. The hang tab 100 includes a hang portion 102, a support portion 104, and a hinge portion 106 that extends along the X-axis and separates the hang portion 102 from the support portion 104. The hinge portion 106 protrudes in the Y-direction from the hang portion 102 and the support portion 104, forming a U-shape as shown in FIGS. 1B and 1C. The hang portion 102 and the support portion 104 of the hang tab 100 can be formed such that their major surfaces are both parallel to a plane (e.g., X-Z plane) when they are unloaded and/or are not in use, as shown in FIG. 1A.

The hang portion 102 of the hang tab 100 generally includes a slot 108, a slot reinforcing portion 110 that surrounds the slot 108, a central region 115, and a circumference reinforcing portion 116. In some configurations, as illustrated in FIG. 1A, the slot reinforcing portion 110 is surrounded by the central region 115, and the central region 115 is surrounded on at least three edges by the circumference reinforcing portion 116 and one edge by the hinge portion 106.

Figure 2A:
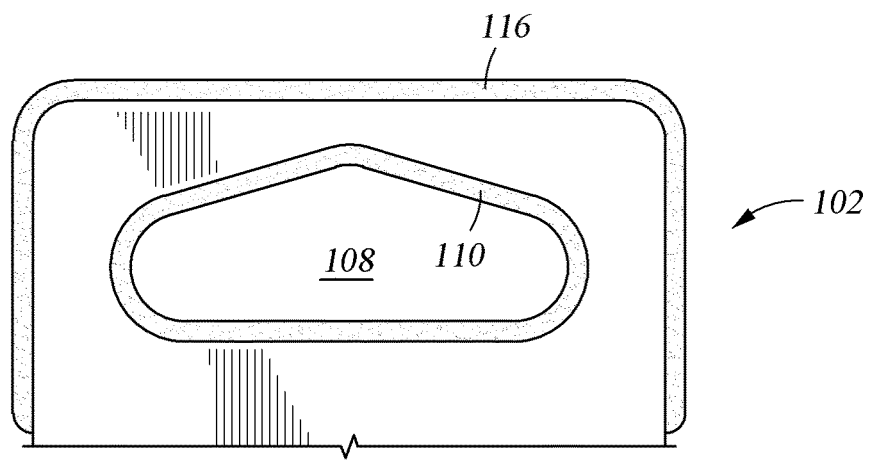
FIGS. 2A, 2B, and 2C schematic views of an opening formed in a hang tab, according to one or more embodiments.
Figure 2B:
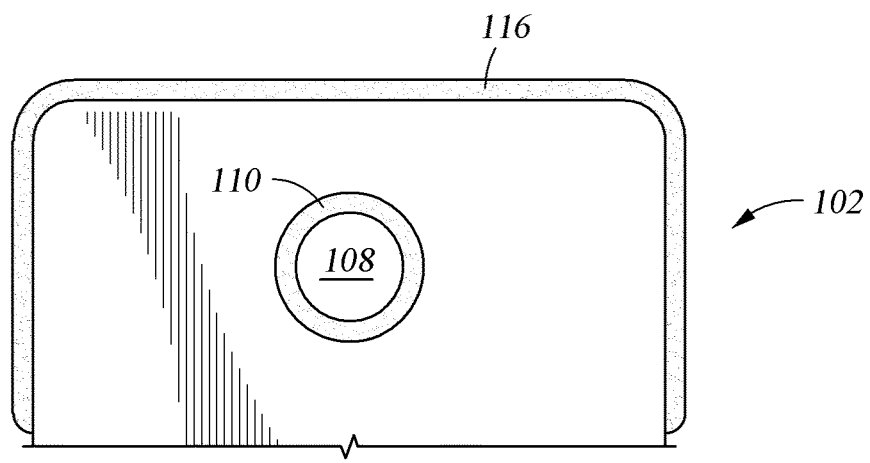
Figure 2C:
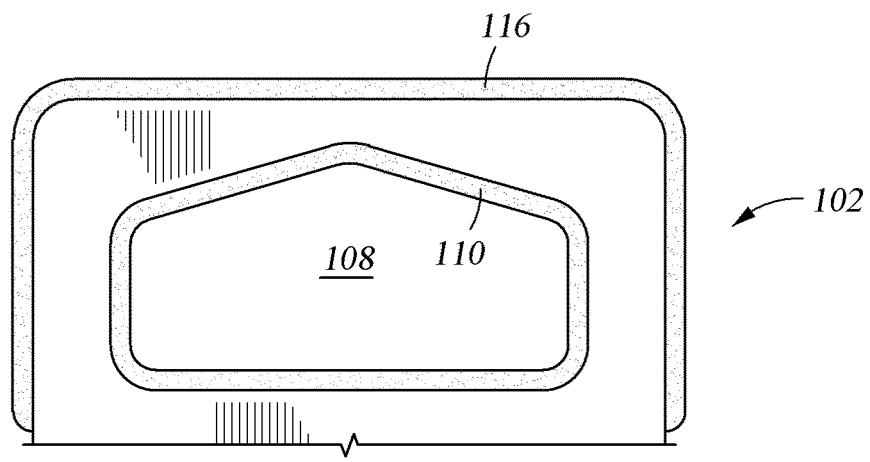

The slot 108 of the hang portion 102 is configured to receive a display supporting element, such as a wire hanger or support hook (e.g., peg-board hook, wall mounted hook, etc.), for example, when a package or an object, to which the hang tab 100 is attached, is being suspended from the display supporting element in a retail store for display. In some embodiments, the slot 108 is a so-called "Euro style" slot as shown in FIG. 1A. The slot 108 may be a "delta style" slot as shown in FIG. 2A, a round slot as shown in FIG. 2B, a "heavy duty style" slot as shown in FIG. 2C, or an opening having any other desirable shape (e.g., circular, oval, triangular).

The slot reinforcing portion 110, which is formed around the perimeter of the slot 108, is configured to prevent the hang portion 102 from ripping or tearing due to the weight of a package, or an object to which the hang tab 100 is attached, when it is suspended from a display supporting element.

The circumference reinforcing portion 116, which is formed on the perimeter of the hang portion 102 is configured to further prevent the hang portion 102 from tearing due to the load provided by the display supporting element and/or structurally degrading (e.g., fraying) due to contact with other external components during shipping or storage. In some configurations, the hang portion 102 may have rounded top corners 114.

In some embodiments, the hang portion 102 has a length $L_H$ in the X-direction of between 40 and 60 mm and a width $W_H$ in the Y-direction of between 15 and 35 mm, the support portion 104 has a length $L_S$ in the X-direction of between 40 and 110 mm and a width $W_S$ in the Y-direction of between 6 and 50 mm, and the hinge portion 106 has a length $L_G$ in the X-direction of between 30 and 50 mm and a width $W_G$ in the Y-direction of between 2 and 6 mm. The slot 108 may have a length $L_{SLOT}$ in the X-direction of between 20 and 45 mm. The slot reinforcing portion 110 has a width $W_{SR}$ of between 2 and 3 mm and a thickness $T_{SR}$ of between 1 and 1.5 mm. The circumference reinforcing portion 116 has a width $W_{CR}$ of between 2 and 3 mm and a thickness $T_{CR}$ of between 1 and 1.5 mm. The hang portion 102 may have rounded top corners 114 having a corner radius of between 3 and 6 mm.

In some embodiments, the hang tab 100 is attached to a surface of a package 302, 402 that is to be suspended from a display supporting element, as illustrated in FIGS. 3A-3D and 4A-4D. In general, the package 302,402 may include one or more walls that enclose a consumer product. In some embodiments, the consumer product is disposed within an internal region of the package 302,402 that has a cylindrical, rectangular or other useful external configuration of walls that are formed from various conventional eco-friendly and/or non-eco-friendly materials. Typical, consumer products can include, but are not limited to, durable and non-durable goods, which may include, for example, consumer electronics (e.g., wireless speakers, mice, keyboards, cameras, headphones), business products or other useful product that can be bought and sold.

Figure 3A:
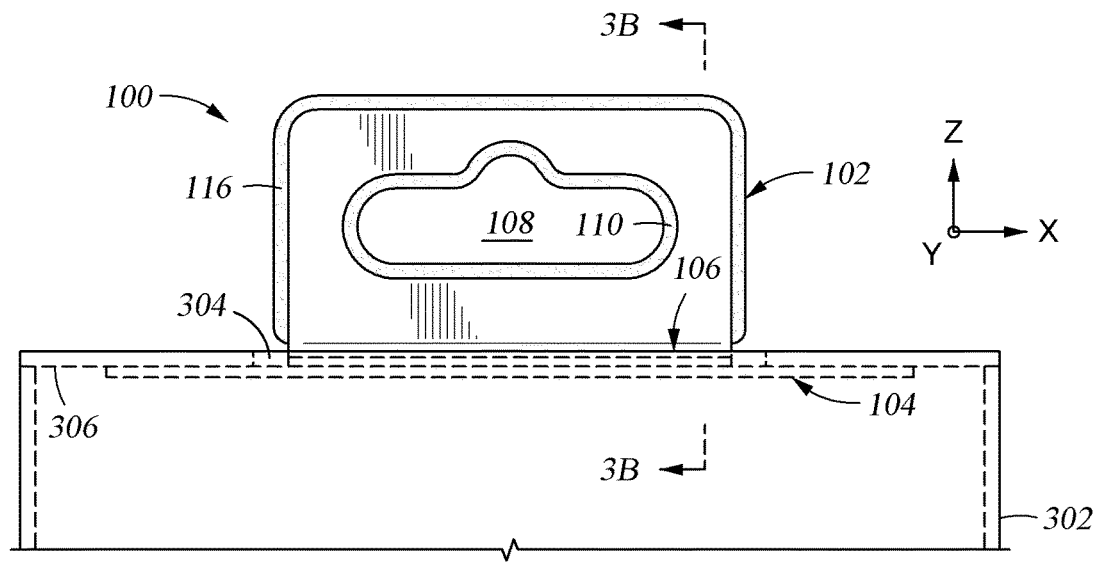
FIGS. 3A and 3B are a front view and a side cross-sectional view of a hang tab when attached to a package and unfolded, according to one or more embodiments.
Figure 3B:
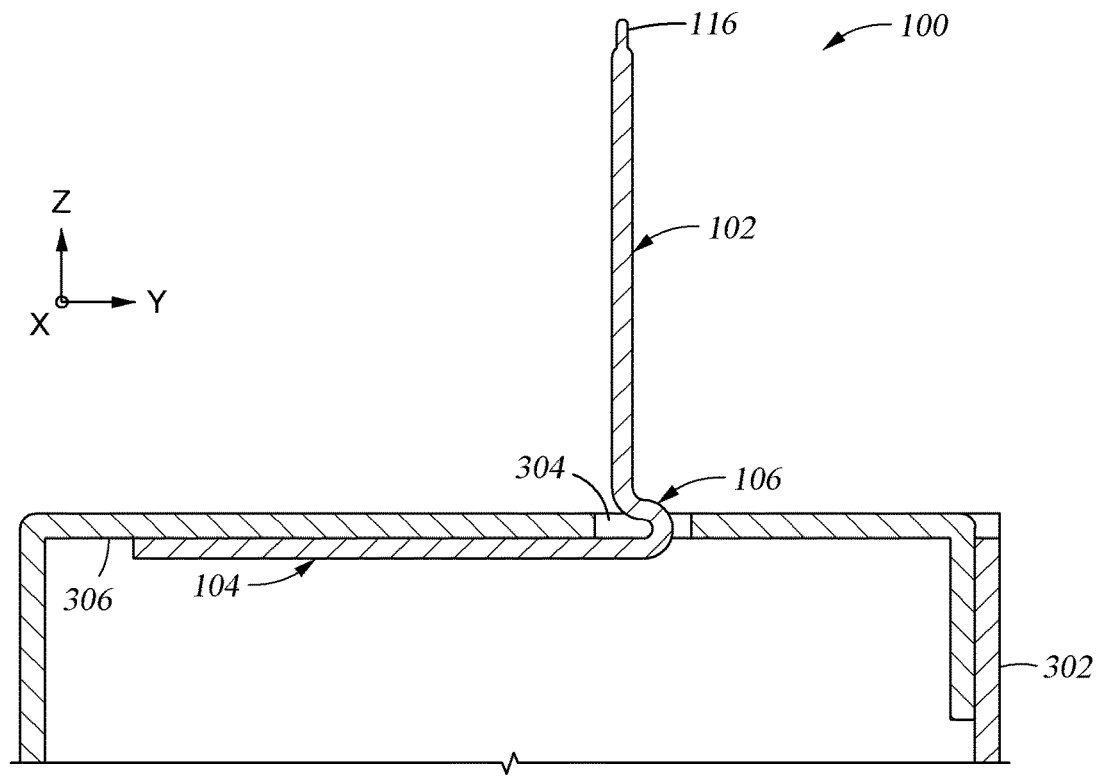
Figure 3C:
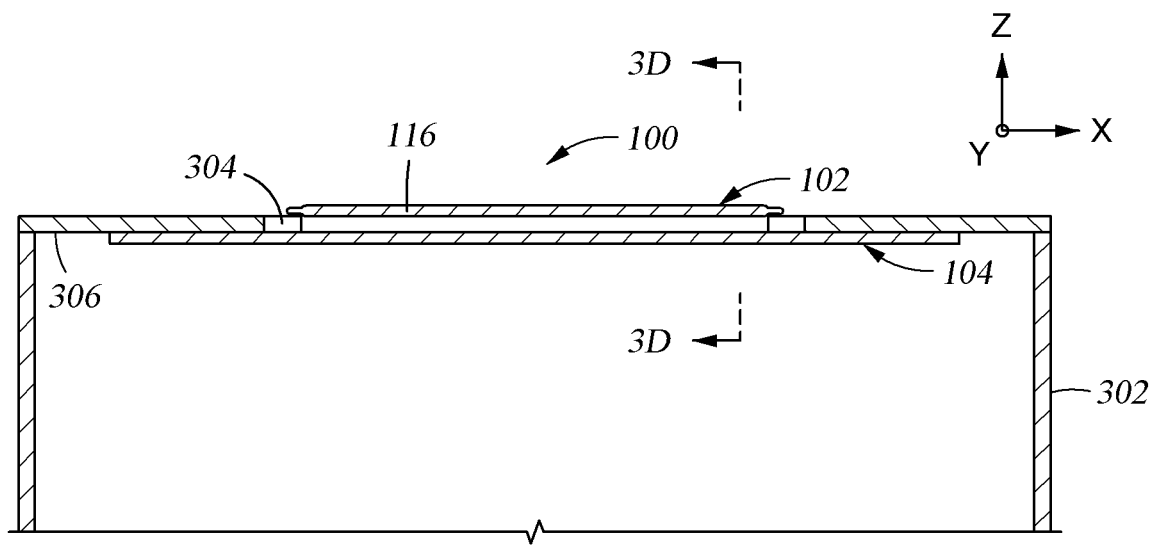
FIGS. 3C and 3D are a front view and a side cross-sectional view of a hang tab when folded, according to one or more embodiments.
Figure 3D:
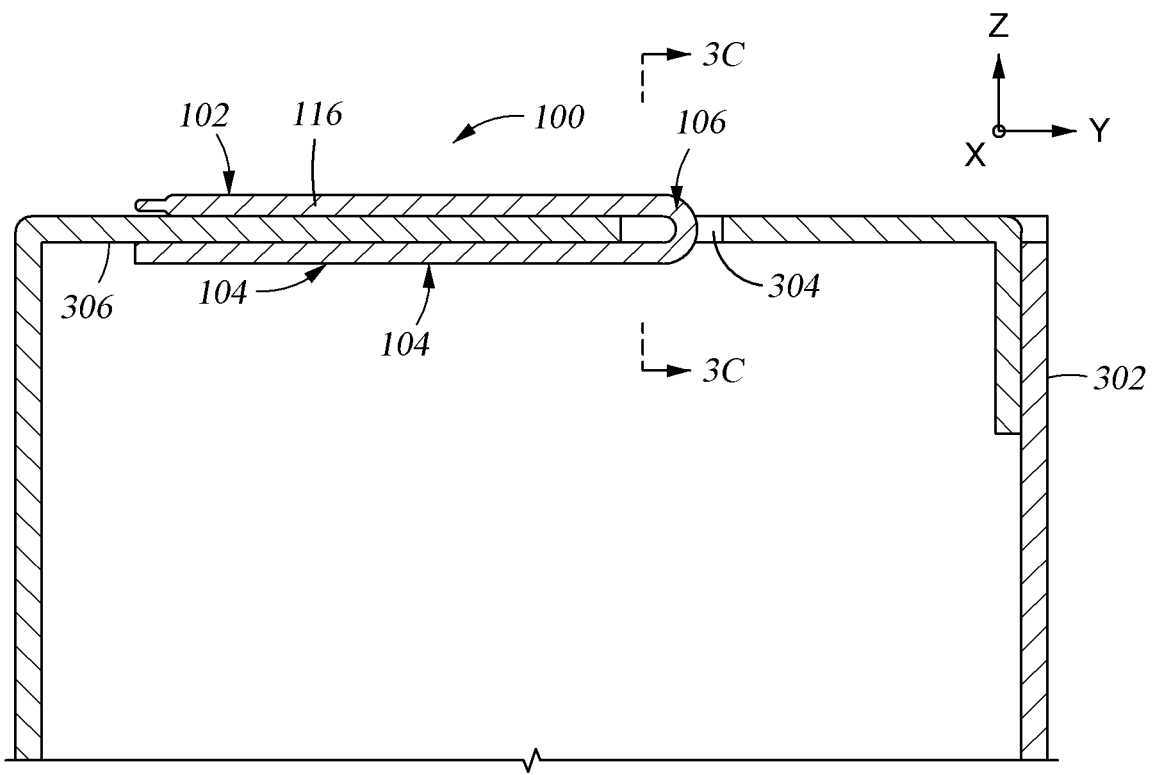

In some embodiments, the hang tab 100 is attached to an inner top surface of a package 302 that is to be suspended from a display supporting element, as illustrated in FIGS. 3A-3D. FIGS. 3A and 3B are a front view and a side cross-sectional view of the hang tab 100 when the hang tab 100 is attached to a package 302 and unfolded. FIGS. 3C and 3D are a front view and a side cross-sectional view of the hang tab 100 when the hang tab 100 is folded for shipment or storage. In FIGS. 3A-3D, the support portion 104 is inserted inside the package 302 through a slit 304 and optionally adhered to an inner top surface 306 of the package 302 by one or more adhesives 112 disposed on an attachment region 113 of the support portion 104. The adhesive 112 may include a glue, cement, mucilage, or paste that will allow the attachment region 113 to be permanently or semi-permanently affixed to another external body, and may include a pressure sensitive adhesive, contact adhesive, solvent-based adhesive, polymer dispersion adhesive, hot-melt adhesive, anaerobic adhesive, single or multi-part adhesive or other useful material that can be used to bond the attachment region 113 to another external body.

When the package 302 is suspended from a display supporting element, the hang tab 100 is unfolded such that the hang portion 102 is oriented, in an upright position, to receive the display supporting element. The hang portion 102 and the support portion 104 make a non-zero angle. That is, in FIG. 3A, the hang portion 102 and the support portion 104 make a right angle or near right angle, such as an angle of about 90°. In this configuration, the hang tab 100 is configured to fold along the hinge portion 106, for example, during shipment or storage, such that the hang portion 102 faces the support portion 104. That is, the hang portion 102 holds against the package 302, when the hang tab 100 is attached to the package 302, and thus a space required for shipment or storage of the package 302 is reduced. When the hang tab 100 is folded, the hang tab 100 bends along the hinge portion 106 by approximately 90° from the unfolded position in FIG. 3B. As shown in FIGS. 1B and 1C, the hinge portion 106 is of a U-shape such that the hang tab 100 can bend approximately 90° from the unfolded position.

Figure 4A:
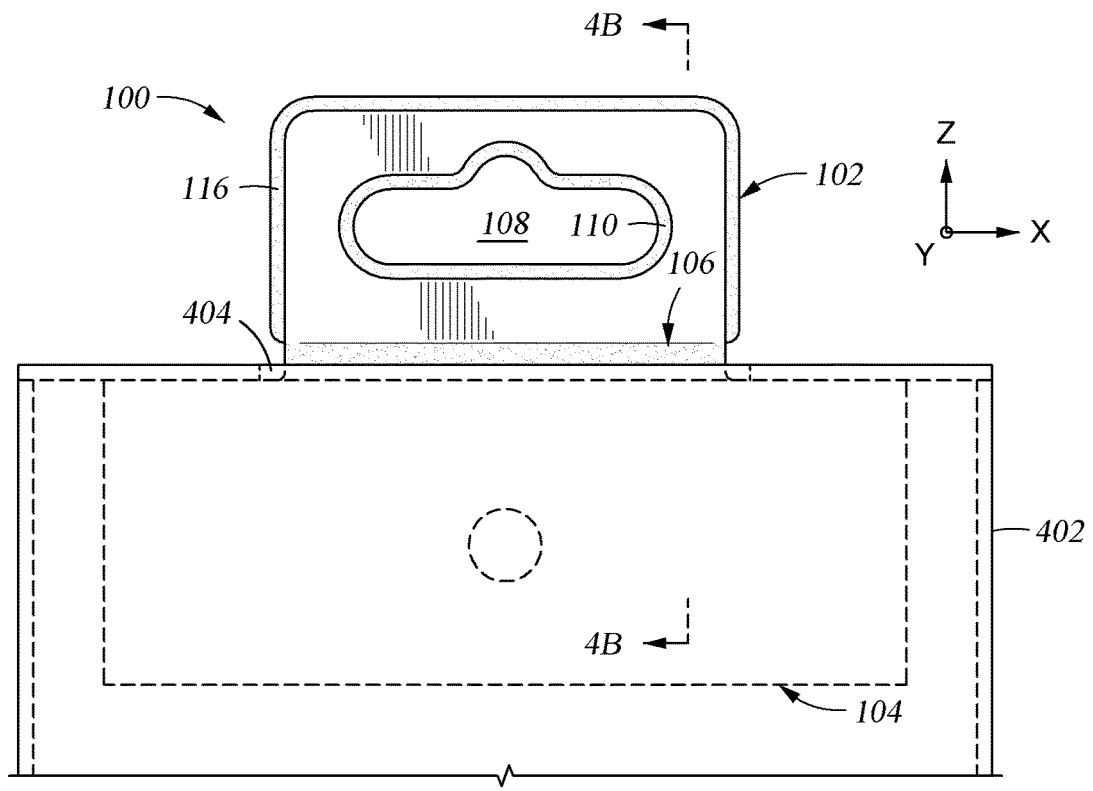
FIGS. 4A and 4B are a front view and a side cross-sectional view of a hang tab when attached to a package and unfolded, according to one or more embodiments.
Figure 4B:
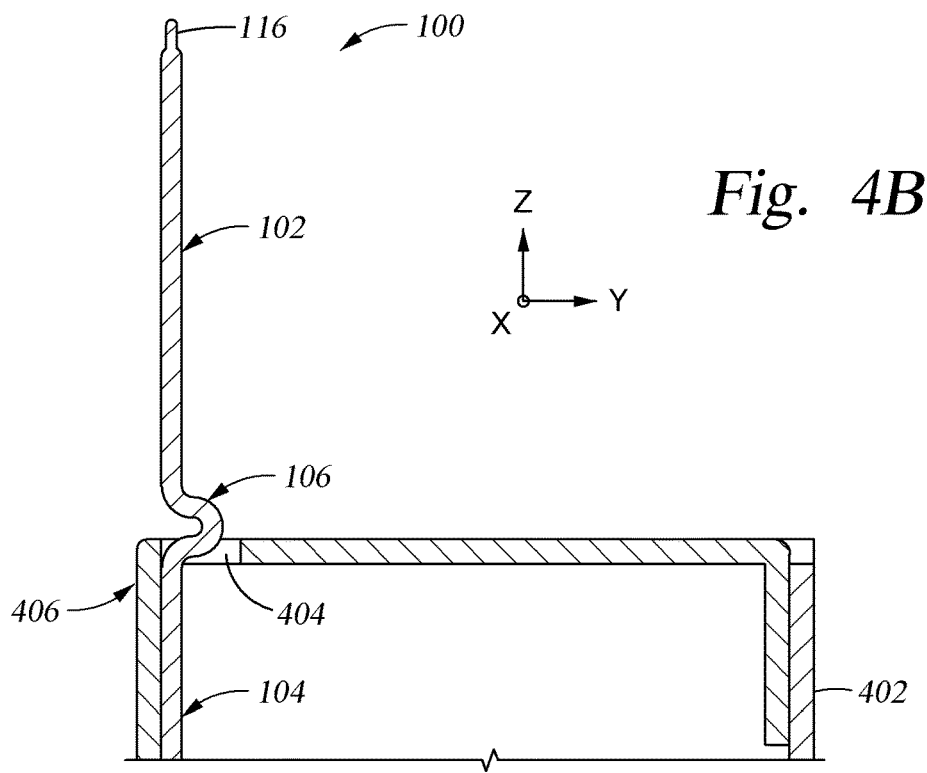
Figure 4C:
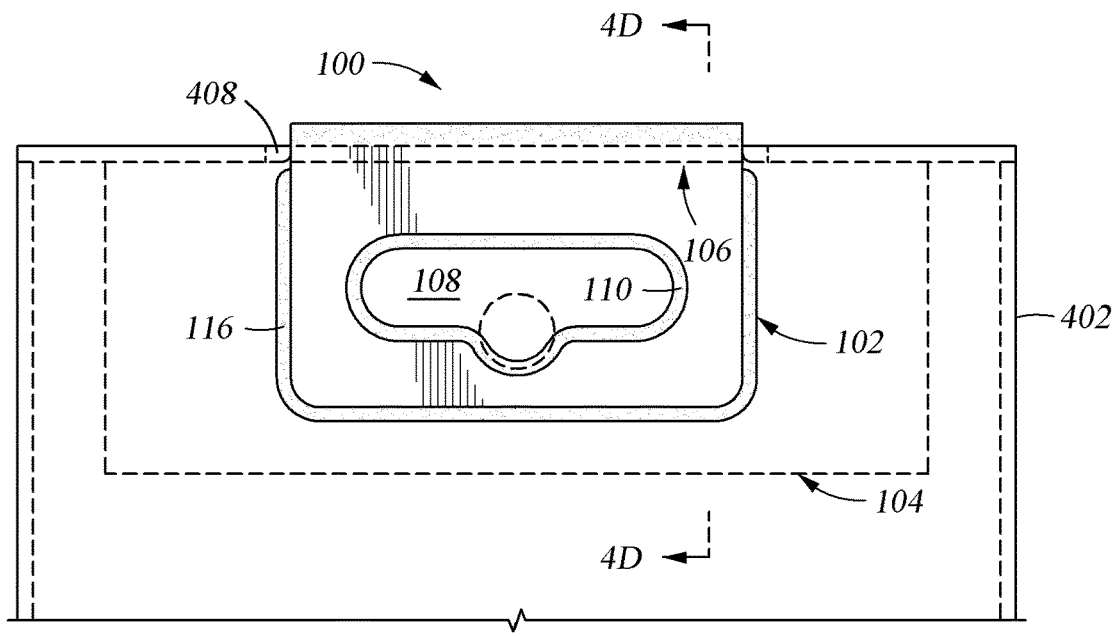
FIGS. 4C and 4D are a front view and a side cross-sectional view of a hang tab when folded, according to one or more embodiments.
Figure 4D:
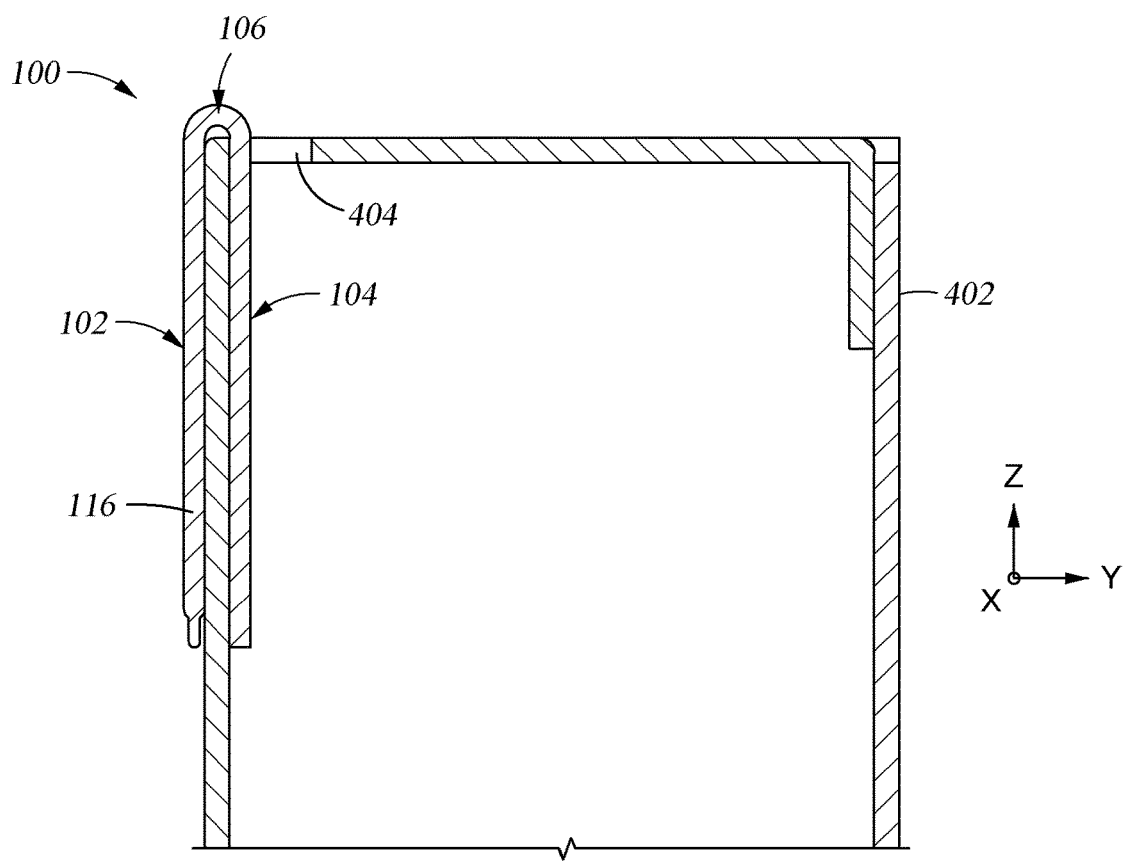

In some embodiments, the hang tab 100 is attached to an inner side surface of a package 402 of an object to be suspended from a display supporting element. FIGS. 4A and 4B are a front view and a side cross-sectional view of the hang tab 100 when the hang tab 100 is attached to a package 402 and unfolded. FIGS. 4C and 4D are a front view and a side cross-sectional view of the hang tab 100 when the hang tab 100 is folded. In FIGS. 4A-4D, the support portion 104 is inserted inside the package 402 through a slit 404 and optionally adhered to an inner side surface 406 of the package 402 by the one or more adhesives 112 disposed on the attachment region 113 of the support portion 104.

When the package 402 is being suspended from a support element, the hang tab 101 is unfolded such that the hang portion 102 and the support portion 104 make an obtuse angle, such as an angle of greater than 90° and less than or equal to about 180°. In this configuration, the hang tab 100 is configured to fold along the hinge portion 106, for example, during shipment or storage, such that the hang portion 102 faces the support portion 104. That is, the hang portion 102 holds against the package 302, 402, when the hang tab 100 is attached to the package 402, and thus a space required for shipment or storage of the package 402 is reduced. When the hang tab 100 is folded, the hang tab 100 bends along the hinge portion 106 by approximately 180° from the unfolded position in FIG. 4B. As shown in FIGS. 1B and 1C, the hinge portion 106 is of a U-shape such that the hang tab 100 can bend approximately 180° from the unfolded position.

It should be noted that the particular example embodiments described above are just some possible examples of packages to which a hang tab according to the present disclosure can be attached, and do not limit the possible configurations of hang tabs or packages according to the present disclosure. For example, shapes of packages and locations of a package to which a hang tab can be attached are not limited to the particular examples described above. For example, a hang tab 100 can be attached to a package or an object of any shape. In another example, the hang tab 100 may be attached to an outer surface of a package or an object.

When a package or an object to which the hang tab 100 is attached is suspended from a display supporting element, a force F is applied to the hang tab 100, due to the weight of the package or the object that hang tab 100 is supporting, as illustrated in FIG. 1A, may cause ripping or tearing of the hang tab 100 starting from the slot 108. The force F illustrated in FIG. 1A is shown as a single point load, which is aligned in the Z-direction, to represent the reaction force applied to a portion of the slot 108 of the hang tab 100 by the display supporting element. However, this schematic representation of the force F applied to the hang tab 100 is not intended to be limiting as to the scope of the disclosure provided herein since more than one display supporting element may be inserted within the slot 108 to support the hang tab 100, and thus apply more than a single point load may be applied to the hang tab 100. The load applied to the hang tab 100 by the display supporting element(s) may include a bearing type load that is distributed over a finite length of the slot reinforcing portion 110 due to the contact between the display supporting element and a portion of the slot reinforcing portion 110 versus the schematically shown single contact point load. Further, ripping or tearing of the hang tab 100 from the slot 108 due to the applied force F, may propagate to an edge of the hang portion 102 and cause breaking of the hang portion 102. Structural degrading (e.g., fraying) due to contact with other external components during normal use, shipping or storage may cause breaking of the hang portion 102 from the edge. Repeated folding and unfolding of the hinge portion 106 may also cause breaking of the hinge portion 106.

In some embodiments, the hang tab 100 includes a hang tab body that includes a material that comprises a fibrous material, such as a lignocellulosic fibrous material, that is formed into a desirable structural shape. The hang tab body generally includes all of the physical elements of the hang portion 102, the support portion 104, and the hinge portion 106. Examples of useful fibrous materials include materials formed from pulp that is prepared by chemical and/or mechanical treatments. Useful fibrous materials include, but are not limited to, materials formed from various types of plant materials, such as wood, straw, bamboo, bagasse, kenaf, flax, hemp, cotton, or the like. Wood currently provides raw material for vast majority of pulp production and contains one or more of the major groups: cellulose, hemicellulose, lignin, and extractives. Depending on the contents, wood can be classified into one of two main families, hardwoods (also referred to as "short-fiber pulp" or "short-fiber wood pulp") and softwoods (also referred to as "long-fiber pulp" or "long-fiber wood pulp"). Overall, hardwoods contain more cellulose and extractives and less lignin than softwoods. For pulp purposes, softwood fibers are, on average, more than three times the length of those contained in hardwoods. Since increasing fiber length usually translates into more inter-fiber bonding, softwood pulps impart greater strength to the products into which they are made, than do hardwood pulps manufactured by the same process. In one example, the hang tab body is formed of long-fiber pulp to promote its ability to support a load for an extended period of time. In the consumer products industry, for example, it is desirable for a single hang tab 100 to support a package that has a mass between about 0.01 kilograms (kg) and about 5 kgs.

In some embodiments, various physical attributes found within different portions of the hang tab 100 may be adjusted to provide the necessary structural support to allow a packaged consumer product to be displayed using the hang tab 100. As discussed herein, the differing physical attributes within a hang tab 100 can include the physical shape (e.g., thickness, overall structural shapes formed in the X-Y, X-Z or Y-Z planes, etc.) of different portions of the hang tab 100, materials used in different portions of the hang tab, and different material properties (e.g., mass density, porosity) used in different portions of the hang tab. In some embodiments, the slot reinforcing portion 110, the circumference reinforcing portion 116, and the hinge portion 106 have differing material properties or material compositions than other portions of the hang tab 100. In some embodiments, material within the slot reinforcing portion 110, the circumference reinforcing portion 116, and the hinge portion 106 have a higher material density (e.g., mass per unit volume) of the fibrous material in other regions of the hang tab body. In some embodiments, the difference in density is formed by the compression of different initial volumes of material during the processes of forming the hang tab 100, thus making the more dense regions more durable against ripping, tearing, or breaking. To further provide tear resistance, the structure and material within the hang tab 100 can be processed (e.g., embossed, machined, etc.) to form structural elements within different regions of the hang tab 100.

Figure 5A:
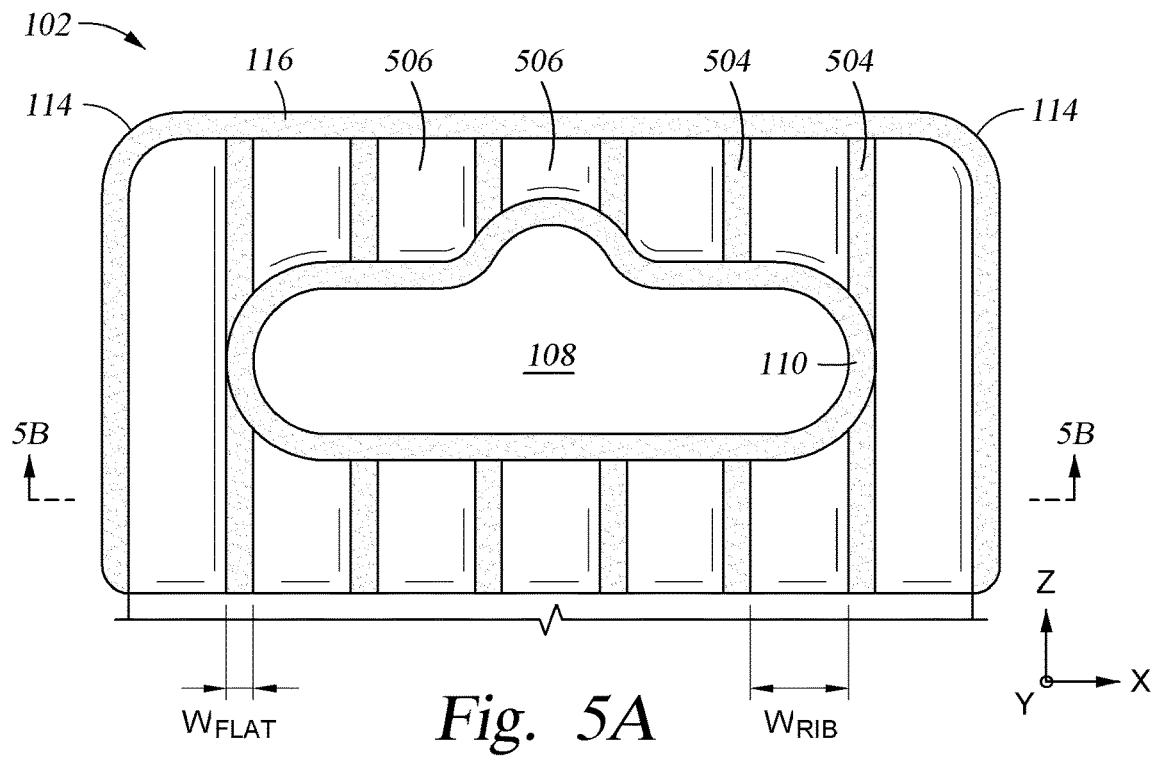
FIGS. 5A-5E show patterns of structural elements on a hang portion of a hang tab, according to one or more embodiments.
Figure 5B:
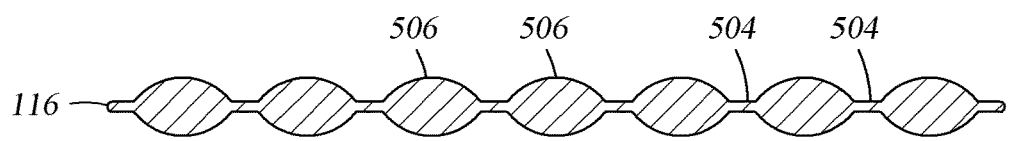

FIGS. 5A-5E schematically illustrate various types of structural elements that can be formed in the central region 115 of the hang portion 102 of the hang tab 100. It is believed that by forming the various structural elements, or texture patterns, in the central region 115 of a hang tab 100 various failure mechanisms commonly found when supporting a package by use of a display supporting element that includes eco-friendly materials can be reduced. The various structural elements generally include structural shapes that are formed by some manufacturing process, and are created to provide tear resistance to prevent failure of the hang tab 100 during use. In some embodiments, the structural elements include a one-dimensional (1D) pattern 502 of alternating ridge regions 504 and channel regions 506 within the central region 115, which have a differing thickness in the Y-direction, and extend in the Z-direction as shown in FIG. 5A. FIG. 5B is a cross-sectional view of the 1D pattern 502 of alternating ridge regions 504 and channel regions 506 cut along the sectioning line "5B-5B." In some embodiments, as illustrated in FIG. 5B, the ridge regions 504 are generally thinner than the channel regions 506, and at least a portion of the material within the ridge regions 504 has a higher mass density than the channel regions 506. A thickness of the ridge regions 504 is between 1 and 1.3 mm. A thickness of the channel regions 506 is between 1.2 and 1.5 mm. In some embodiments, the ridge regions 504 each have a width $W_{FLAT}$ of between 1 and 2 mm and the channel regions 506 each have a $W_{RIB}$ of between 2 and 4 mm.

Figure 5C:
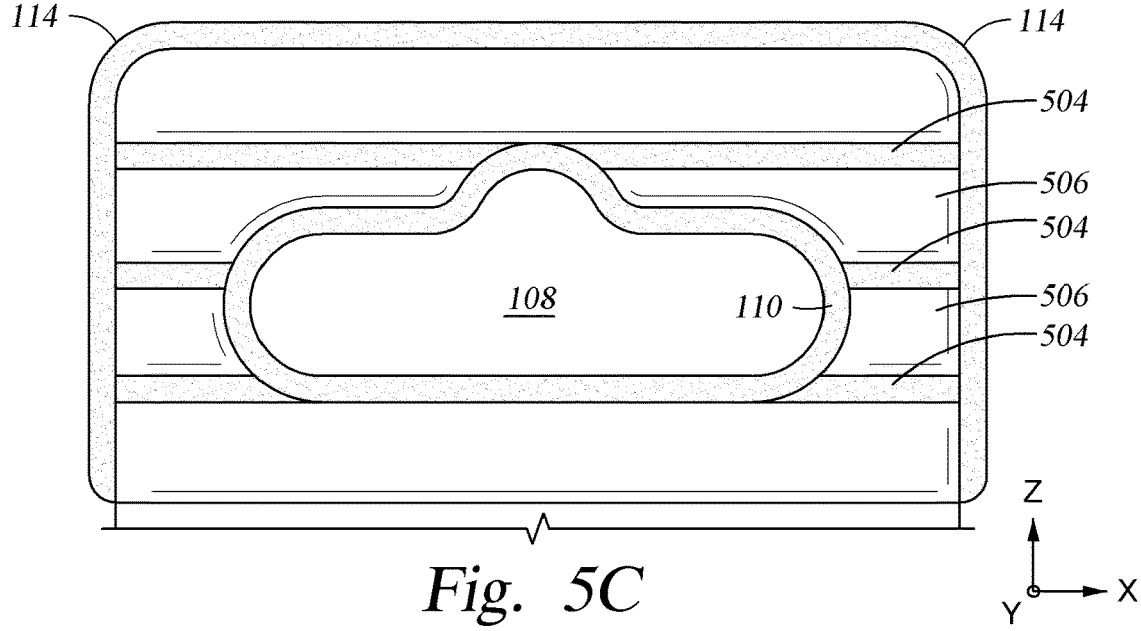
Figure 5D:
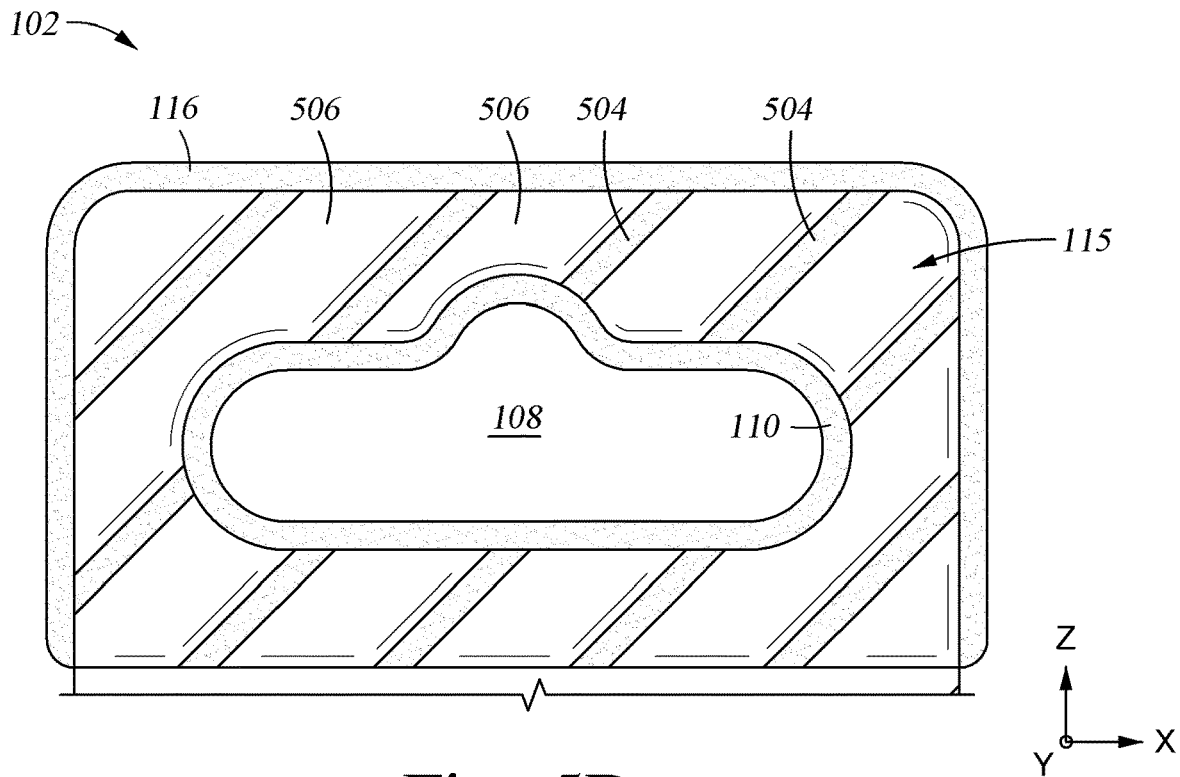
Figure 5E:
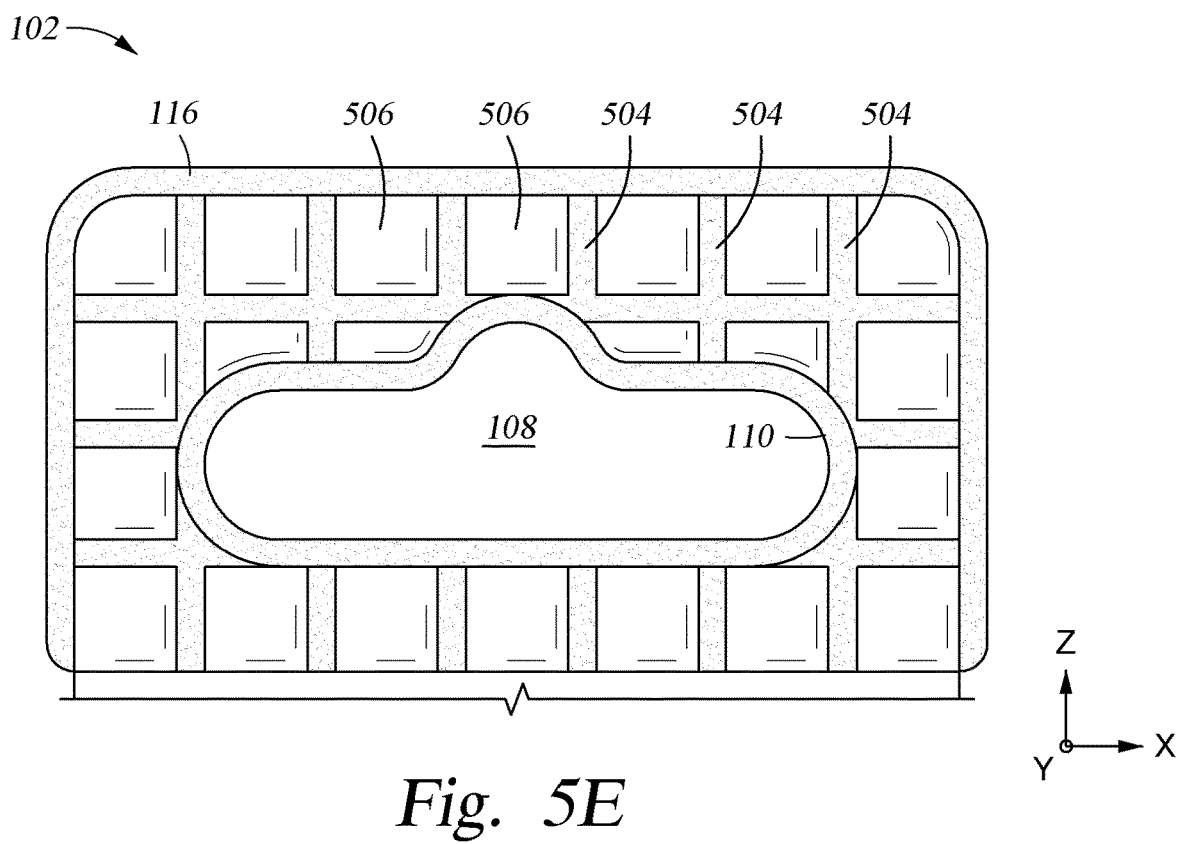

In some embodiments, the central region 115 of the hang tab 100 includes a 1D pattern 502 of alternating ridge regions 504 and channel regions 506 extend along the X-axis as shown in FIG. 5C, or in a direction that makes an acute angle with the Z-axis (e.g., direction that force F (FIG. 1A) is applied) as shown in FIG. 5D. In some embodiments, the 1D pattern 502 of alternating ridge regions 504 and channel regions 506 extend along a direction that makes an acute angle with the axis of the hinge portion 106 (i.e., X-direction in FIG. 1A). In some embodiments, the formed structural elements include a two-dimensional (2D) array of interleaving ridge regions 504 and channel regions 506 as shown in FIG. 5E. It should be noted that the particular example embodiments described above are just some possible examples of patterns of structural elements on the hang portion 102 according to the present disclosure, and do not limit the possible configurations, specifications, or the like of hang tabs or packages according to the present disclosure. For example, the number of ridge regions and the number of channel regions can be different from numbers than the ones shown in FIGS. 5A-5E.

In some embodiments, the ridge regions 504, channel regions 506, slot reinforcing portion 110, and the circumference reinforcing portion 116 all have at least one different physical attribute, such as, but not limited to, a different thickness, mass density, material composition, or width in X-Y plane. In one embodiment, the slot reinforcing portion 110 and the circumference reinforcing portion 116 have the same thickness, mass density, material composition, and width in X-Y plane, and the ridge regions 504 and channel regions 506 have at least one different physical attribute from the slot reinforcing portion 110 and the circumference reinforcing portion 116.

Figure 6:
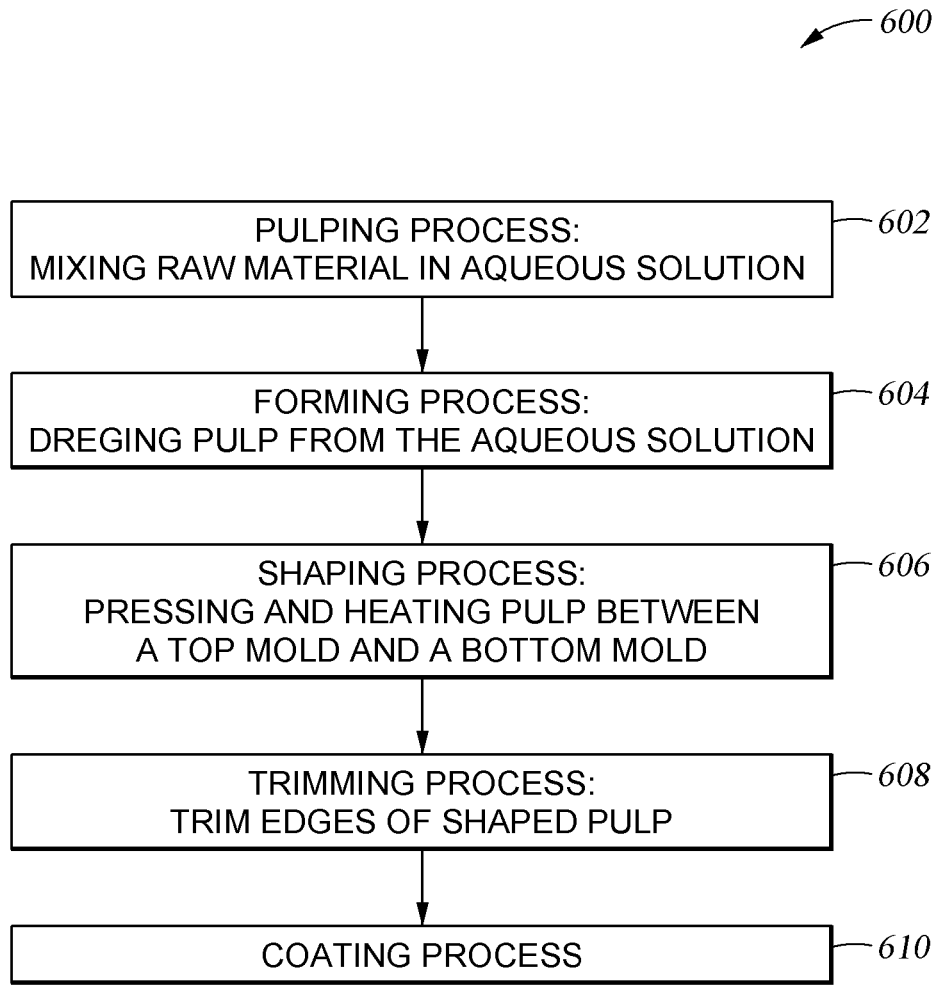
FIG. 6 depicts a flowchart illustrating a method of fabricating a hang tab, according to one or more embodiments.

FIG. 6 depicts a flowchart illustrating a method 600 of fabricating a hang tab 100 according to one embodiment. In a pulping process (block 602), raw material is mixed in aqueous solution of chemical regents at a temperature of between 145 and 150 degrees C. and converted into pulp. The chemical regents include alkali hydrogen peroxide, such as sodium hydroxide in the form of a lye or caustic soda, which removes the lignin that binds fibers, and oxygen that breaks down the chemical structures of the lignin. The chemical regents further include chlorine dioxide and hydrogen peroxide for bleaching the pulp. In some embodiments, raw material is long-fiber wood pulp containing 99% of cellulose, and the aqueous solution includes 0.4% of sodium hydroxide, 0.4% of include chlorine dioxide, 0.4% of hydrogen peroxide, and 0.1% of oxygen. A concentration ratio of the raw material to the aqueous solution is between about 7:3 and about 6:4, for example, about 6:4.

Figure 7A:
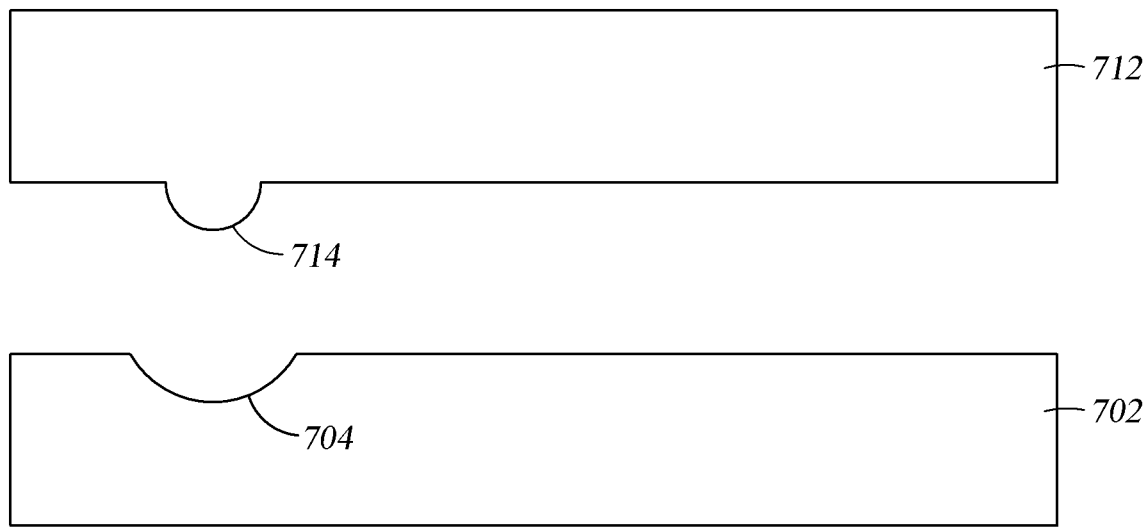
FIGS. 7A and 7B are side views of a bottom mold and a top mold, according to one or more embodiments.
Figure 7B:
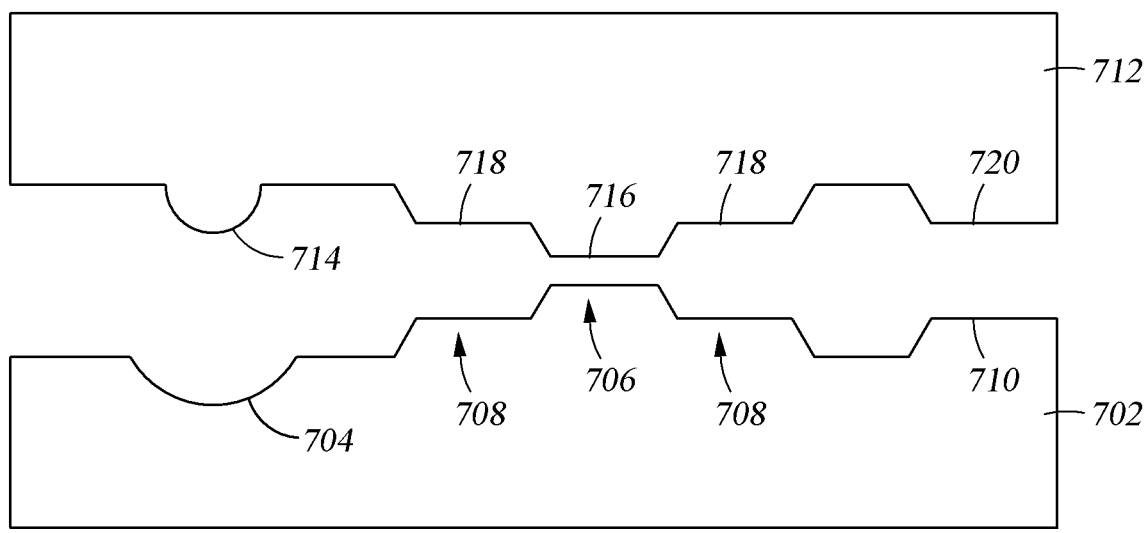
Figure 8A:
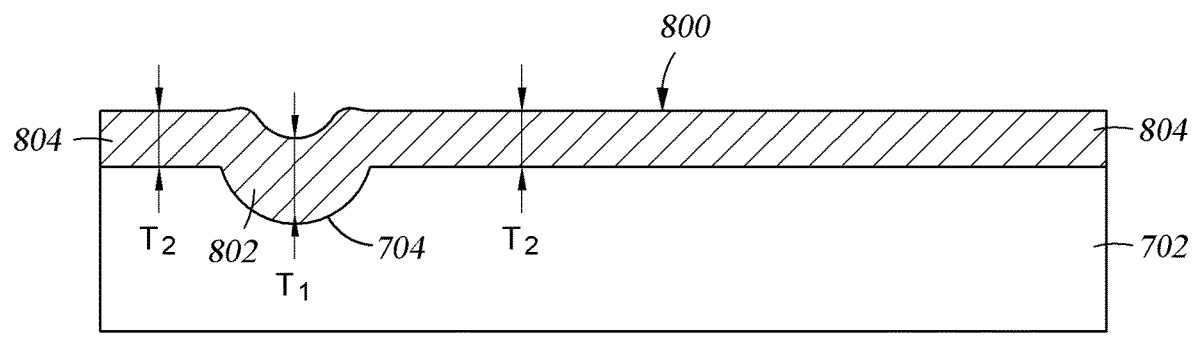
FIG. 8A is a side view of the bottom mold and the top mold of FIG. 7A which includes a layer of uncompressed pulp material, according to one or more embodiments.

In a forming process (block 604), the pulp is dredged, or separated, from the aqueous solution by sending the mixture through a metal mesh. The metal mesh may be made of stainless steel and have a mesh size 80/1.2 (e.g., 80 openings in 1.2 inch). The pulp is further exposed to a vacuum on one side of the mesh to bind the fibers within the pulp for a time duration of between about 5 seconds and about 10 seconds, for example, about 10 seconds. The dredged pulp is then placed into a bottom mold 702. In FIGS. 7A and 7B, side views of a proximity of a concave portion 704 (extending in the X-direction) of the bottom mold 702 that forms the hinge portion 106 of the hang tab 100 along the lines A-A' and B-B', respectively, are shown. In some embodiments, the concave portion 704 has a depth of between 2.5 and 3.5 mm and a width of between 2 and 6 mm. The bottom mold 702 further includes a protrusion 706 that forms the slot 108, elevated portions 708 around the protrusion 706 that form slot reinforcing portion 110, and an elevated portion 710 that forms circumference reinforcing portion 116. In some embodiments, as illustrated in FIG. 8A, the dredged pulp (or uncompressed pulp material) is placed into the concave portion 704 of the bottom mold 702 to form a material layer 800 that has a layer thickness 802 having a thickness $T_1$ of between about 2.5 and 3.5 mm in a first region and a layer thickness 804 having a thickness $T_2$ of between about 2 and 3 mm in a second region. In some embodiments, as illustrated in FIG. 8A, one or more regions of the material layer 800 disposed over a bottom mold has thickness $T_1$ that is greater than the thickness a thickness $T_2$. In one example, the thickness $T_1$ is between about 1.1 and about 1.5 times greater than the thickness $T_2$, such as between 2.5 and 1.5 times greater.

In a shaping process (block 606), the material layer that was placed between the bottom mold 702 and a top mold 712 during the block 604 is then compressed by applying a force of between about 10 kgf and about 15 kgf, for example about 15 kgf, for a time duration of between about 5 seconds and about 120 seconds, for example, 120 seconds. The bottom mold 702 and the top mold 712 may be made of a metal alloy and heated to a temperature of between about 120° C. and about 150° C., for example, about 150° C. during the compression step.

In processes that utilize the mold design illustrated in FIG. 7B, the top mold 712 has a convex portion 714 that matches the concave portion 704 the bottom mold 702 and together forms the hinge portion 106 of the hang tab 100. The top mold 712 further includes a protrusion 716 that matches the protrusion 706 of the bottom mold 702 and together forms the slot 108 (i.e. the pulp placed on the protrusion 706 is removed), lowered portions 718 that match the elevated portions 708 of the bottom mold 702 and together form slot reinforcing portion 110, and a lowered portion that matches the elevated portion 710 and together forms circumference reinforcing portion 116. The mold configuration illustrated in FIG. 7B can thus be used to form a hang tab 100, which includes the support portion 104, the hinge portion 106 and the hang portion 102 of a hang tab 100, wherein the hang portion 102 includes a slot 108, a slot reinforcing portion 110, a central region 115, and a circumference reinforcing portion 116.

Figure 8B:
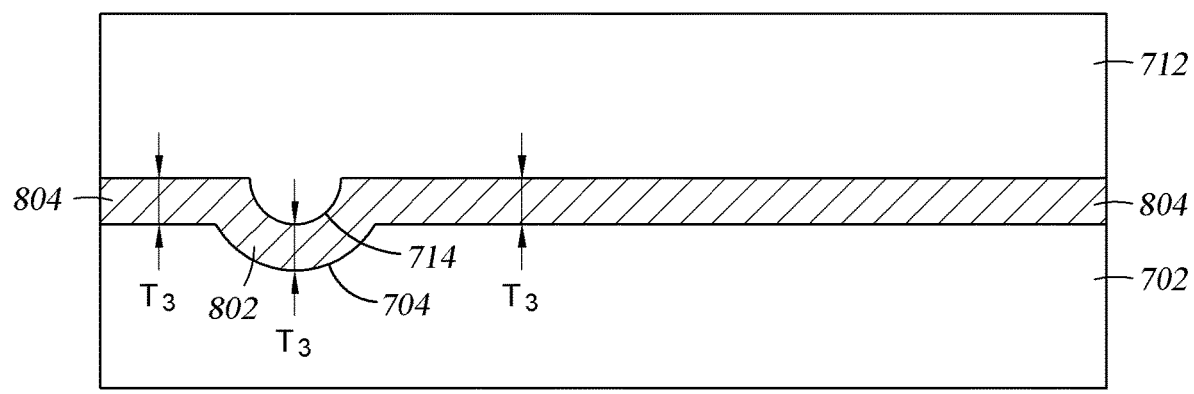
FIG. 8B is a side view of the bottom mold and the top mold of FIG. 8A after the layer of pulp material has been compressed by the bottom and top molds to form a hang tab, according to one or more embodiments.

In some embodiments, as shown in FIGS. 8A-8B, during the processes performed during block 606, using the simpler mold configuration shown in FIG. 7A for ease of discussion purposes only, the layer of the pulp positioned in the concave portion 704 is compressed from the original thickness $T_1$ to a thickness $T_3$ of between 1 and 1.4 mm (FIG. 8B) and the layer 804 of the pulp on the remaining portions of the bottom mold 702 is compressed from the thickness $T_2$ to the same thickness $T_3$ of between 1 and 1.4 mm (FIG. 8B), and thus the hinge portion 106 (formed from the layer of pulp in the concave portion 704) has higher material density than the remaining portions of the hang portion 102. The increase in density in the hinge portion 106 versus other regions of hang tab 100 is derived from the increased change in volume created during the compression process. In some embodiments, the density of a first region of the material layer 800 is changed from an initial density of 30-40% of the theoretical maximum density to a compressed density of 95-100% of the theoretical maximum density, and the density of a second region of the material layer 800 is changed from an initial density of 30-40% of the theoretical maximum density to a compressed density of 75-85% of the theoretical maximum density. In other embodiments, the density of a first region of the material layer 800 is changed from an initial density of 30-35% of the theoretical maximum density to a compressed density of 95-100% of the theoretical maximum density, and the density of a second region of the material layer 800 is changed from an initial density of 35-40% of the theoretical maximum density to a compressed density of 75-85% of the theoretical maximum density.

In a trimming process (block 608), protruding edges of the shaped pulp created during block 606 are trimmed to form the hang tab 100. Typically, all of the trimmed scraps are returned to the aqueous solution and reused.

In an optional coating process (block 610), the formed hang tab 100 is coated with a material that can bind the fibrous material and/or prevent water absorption when the hang tab 100 requires water-proofing or water-resilience. In some embodiments, the coating configured to cover and seal the exposed surfaces of the hang tab 100 from the external ambient environment. In some embodiments, the coating may include a polymeric coating that is hydrophobic.

In the example embodiments described above, eco-friendly hang tabs made of biodegradable, degradable, or recyclable materials, such as wood pulp and methods of eco-friendly hang tabs have been shown. Eco-friendly hang tabs are reinforced such that the hang tabs can be folded and unfolded without breaking, can be used to hang a package without tearing.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A hang tab for supporting a package, comprising:
   a hang portion comprising:
      an opening formed therein; and
      a central region that at least partially surrounds the opening, wherein the central region comprises:
         two or more first regions; and
         a second region that is disposed between each adjacent pair of two or more first regions, wherein at least one physical attribute of each first region is different than a physical attribute of each second region, wherein the at least one different physical attribute is selected from a group consisting of a thickness and a mass density;
   a support portion having a surface configured to adhere to a portion of the package; and
   a hinge portion is disposed between the hang portion and the support portion, wherein
   when the hang tab is unfolded and the hang portion and the support portion are both parallel to a plane that includes a first direction, the hinge portion protrudes in a second direction that is perpendicular to the first direction, and
   wherein the hang tab comprises a fibrous material.

2. The hang tab of claim 1, wherein the fibrous material comprises wood pulp.

3. The hang tab of claim 1, wherein the hang portion further comprises an adhesive that is disposed on the surface of the support portion.

4. The hang tab of claim 1, wherein
   the first regions each having a first thickness and a first mass density, and the second regions each have a second thickness and a second mass density,
   the first mass density is greater than the second mass density, and
   the first thickness is less than the second thickness.

5. The hang tab of claim 4, wherein at least a portion of the hinge portion has a mass density that is greater than the second density.

6. The hang tab of claim 4, wherein the hang portion comprises:
an opening reinforcing portion formed on a perimeter of the opening, the opening reinforcing portion having a third thickness and a third mass density; and
a circumference reinforcing portion formed on a perimeter of the hang portion, the circumference reinforcing portion having a fourth thickness and a fourth mass density.

7. The hang tab of claim 1, wherein
the two or more first regions, and the second region disposed between each adjacent pair of two or more first regions, extend in a second direction that is perpendicular to the first direction.

8. The hang tab of claim 1, wherein
the two or more first regions, and the second region disposed between each adjacent pair of two or more first regions, extend in a second direction that makes an acute angle with the first direction.

9. The hang tab of claim 1, wherein
the two or more first regions, and the second region disposed between each adjacent pair of two or more first regions, are interleaved in a two-dimensional array in the first direction and a second direction which is perpendicular to the first direction.

10. A package, comprising:
one or more walls that are configured to at least partially enclose a consumer product, wherein the one or more walls having a first surface; and
a hang tab that comprises:
   a hang portion comprising:
      an opening formed therein; and
      a central region that at least partially surrounds the opening, wherein the central region comprises:
         two or more first regions; and
         a second region that is disposed between each adjacent pair of two or more first regions, wherein at least one physical attribute of each first region is different than a physical attribute of each second region, wherein the at least one different physical attribute is selected from a group consisting of a thickness and a mass density;
   a support portion having a support surface that is attached adhered to the first surface of the one or more walls, wherein the support portion is configured to support the package; and
   a hinge portion that extends in a first direction and is disposed between the hang portion and the support portion, wherein
   when the hang tab is unfolded and the hang portion and the support portion are both parallel to a plane that includes a first direction, the hinge portion protrudes in a second direction that is perpendicular to the first direction, and
   wherein the hang tab comprises a fibrous material.

11. The package of claim 10, wherein the fibrous material comprises wood pulp.

12. The package of claim 10, wherein the first surface is formed within an internal region of the package in which the consumer product is disposed.

13. The package of claim 12, wherein the hang portion further comprises an adhesive that is disposed on the surface of the support portion.

14. The package of claim 10, wherein
the first regions each having a first thickness and a first mass density, and the second regions each have a second thickness and a second mass density,
the first mass density is greater than the second mass density, and
the first thickness is less than the second thickness.

15. The package of claim 14, wherein at least a portion of the hinge portion has a mass density that is greater than the second density.

16. The package of claim 14, wherein the hang portion comprises:
an opening reinforcing portion formed on a perimeter of the opening, the opening reinforcing portion having a third thickness and a third mass density; and
a circumference reinforcing portion formed on a perimeter of the hang portion, the circumference reinforcing portion having a fourth thickness and a fourth mass density.

17. The package of claim 10, wherein
the two or more first regions, and the second region disposed between each adjacent pair of two or more first regions, extend in a second direction that is perpendicular to the first direction.

18. The package of claim 10, wherein
the two or more first regions, and the second region disposed between each adjacent pair of two or more first regions, extend in a second direction that makes an acute angle with the first direction.

19. The package of claim 10, wherein
the two or more first regions, and the second region disposed between each adjacent pair of two or more first regions, are interleaved in a two-dimensional array in the first direction and a second direction that is perpendicular to the first direction.

20. A method forming a package, comprising:
attaching a hang tab to a first surface of a package that is configured to at least partially enclose a consumer product, wherein
the package comprises one or more walls that are configured to enclose the consumer product, and the first surface is formed on one of the one or more walls; and
the hang tab comprises:
   a hang portion comprising:
      an opening formed therein; and
      a central region that at least partially surrounds the opening, wherein the central region comprises:
         two or more first regions; and
         a second region that is disposed between each adjacent pair of two or more first regions, wherein at least one physical attribute of each first region is different than a physical attribute of each second region, wherein the at least one different physical attribute is selected from a group consisting of a thickness and a mass density;
   a support portion having a support surface that is attached adhered to the first surface of the one or more walls; and
   a hinge portion that extends in a first direction and is disposed between the hang portion and the support portion, wherein
   when the hang tab is unfolded and the hang portion and the support portion are both parallel to a plane that includes a first direction, the hinge portion protrudes in a second direction that is perpendicular to the first direction, and wherein the hang tab comprises a fibrous material.

\* \* \* \* \*